United States Patent
Heo et al.

(10) Patent No.: US 12,438,176 B2
(45) Date of Patent: *Oct. 7, 2025

(54) FUEL CELL HAVING EXCELLENT SEALING PERFORMANCE

(71) Applicants: HYUNDAI MOTOR COMPANY, Seoul (KR); KIA CORPORATION, Seoul (KR)

(72) Inventors: Yong Suk Heo, Seoul (KR); Jae Min Ahn, Daejeon (KR); Pil Young Lee, Chungcheongnam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 722 days.

This patent is subject to a terminal disclaimer.

(21) Appl. No.: 17/848,650

(22) Filed: Jun. 24, 2022

(65) Prior Publication Data

US 2023/0031961 A1   Feb. 2, 2023

(30) Foreign Application Priority Data

Jul. 16, 2021 (KR) ........................ 10-2021-0093424

(51) Int. Cl.
*H01M 8/2475* (2016.01)
*H01M 8/248* (2016.01)
*H01M 8/2485* (2016.01)

(52) U.S. Cl.
CPC ......... *H01M 8/2475* (2013.01); *H01M 8/248* (2013.01); *H01M 8/2485* (2013.01)

(58) Field of Classification Search
CPC ... H01M 8/2475; H01M 8/248; H01M 8/2485
See application file for complete search history.

(56) References Cited

U.S. PATENT DOCUMENTS

| | | | | |
|---|---|---|---|---|
| 2002/0034673 | A1* | 3/2002 | Bisaka ............... | H01M 8/2484 429/454 |
| 2009/0087720 | A1* | 4/2009 | Okabe ................. | H01M 8/248 429/454 |
| 2009/0214928 | A1* | 8/2009 | Kim ..................... | H01M 8/247 429/434 |
| 2011/0070520 | A1* | 3/2011 | Unoki .................. | H01M 8/248 429/470 |

(Continued)

FOREIGN PATENT DOCUMENTS

KR   10-2021-0049339 A   5/2021

*Primary Examiner* — Imran Akram
(74) *Attorney, Agent, or Firm* — Morgan Lewis & Bockius LLP

(57) ABSTRACT

A fuel cell includes a cell stack in which multiple unit cells are stacked in a first direction, an enclosure enveloping the cell stack and including at least one opening to open at least one of the two end portions of the cell stack, first and second end plates respectively disposed at the two end portions of the cell stack, a clamping member clamping the unit cells, and a coupling screw coupling the clamping member to a target end plate among the first and second end plates. The target end plate includes a body, including a first internal surface facing the cell stack and an external surface, and a partition wall, spaced from the external surface in the first direction to form a gap. The coupling screw passes through the partition wall and couples the clamping member to the body via the gap.

17 Claims, 15 Drawing Sheets

(56) References Cited

U.S. PATENT DOCUMENTS

| | | | |
|---|---|---|---|
| 2016/0043427 A1* | 2/2016 | Goto | B60L 50/71 |
| | | | 429/452 |
| 2018/0062194 A1* | 3/2018 | Naito | H01M 8/2485 |
| 2020/0185732 A1* | 6/2020 | Nam | H01M 8/24 |
| 2021/0119242 A1* | 4/2021 | Baeck | H01M 8/2475 |
| 2021/0126274 A1* | 4/2021 | Heo | H01M 8/2475 |
| 2022/0190376 A1* | 6/2022 | Kim | H01M 8/241 |

* cited by examiner

FUEL CELL HAVING EXCELLENT SEALING PERFORMANCE

CROSS-REFERENCE TO RELATED APPLICATION

The present application claims priority to Korean Patent Application No. 10-2021-0093424, filed on Jul. 16, 2021, the entire contents of which is incorporated herein for all purposes by this reference.

BACKGROUND OF THE INVENTION

Field of the Invention

The present invention relates to a fuel cell.

Description of Related Art

In general, in a fuel cell for a vehicle, each of a plurality of unit cells generates electrical energy using air supplied to one surface of a polymer electrolyte membrane and hydrogen supplied to the opposite surface of the polymer electrolyte membrane, and supplies the generated electrical energy to a vehicle system. To clamp a plurality of unit cells, a fuel cell may include a clamping device including an end plate and a clamping bar.

Furthermore, a unit stack module may include a cell stack, in which multiple unit cells are stacked on one another, and a clamping device. This stack module may be provided in a singular number or in a plural number. In the case in which a plurality of stack modules is provided, a fuel cell requires a separate device capable of distributing hydrogen, air, and coolant. Therefore, a fuel cell including a single stack module may reduce production costs and simplify the structure thereof. Furthermore, in the case of a vehicle in which packaging of components is greatly restricted, like a passenger car, a high-performance vehicle, or the like, a fuel cell including a single stack module is further preferred because the height thereof is minimized.

Meanwhile, various sealing technologies have been developed to protect a cell stack in a fuel cell from external water, dust, or heat.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a fuel cell that substantially obviates one or more problems due to limitations and disadvantages of the related art.

Embodiments provide a fuel cell having excellent sealing performance.

However, the objects to be accomplished by the exemplary embodiments are not limited to the above-mentioned objects, and other objects not mentioned herein will be clearly understood by those skilled in the art from the following description.

A fuel cell according to various exemplary embodiments of the present invention may include a cell stack configured so that a plurality of unit cells is stacked in a first direction, an enclosure surrounding side portions of the cell stack, the enclosure including at least one opening to open at least one of the two end portions of the cell stack, first and second end plates respectively disposed at the two end portions of the cell stack, a clamping member configured to clamp the plurality of unit cells in the first direction together with the first and second end plates, and a coupling screw configured to couple the clamping member to a target end plate disposed at the at least one opening in the enclosure, among the first and second end plates. The target end plate may include a body, including a first internal surface facing the cell stack and an external surface formed opposite to the first internal surface, and a partition wall, spaced from at least a portion of the external surface in the first direction to form a gap between the partition wall and the external surface, the partition wall being coupled to the enclosure and being made of metal. The coupling screw may pass through the partition wall and may couple the clamping member and the body to each other via the gap.

For example, the partition wall may include a first recess portion having a first through-hole formed therein to allow the coupling screw to pass therethrough, and the first recess portion may include a second internal surface and a bottom surface having therein the first through-hole.

For example, the coupling screw may include a head disposed in the first recess portion, a first protruding portion protruding from the head toward the second internal surface in a direction intersecting the first direction, the first protruding portion including a sealing seat surface facing the bottom surface, a sealing portion disposed between the sealing seat surface and the bottom surface, a bearing surface formed to be in contact with the clamping member in the gap, and a threaded portion threadedly engaged with the body.

For example, the partition wall may further include a first reinforcing rib located between the second internal surface and the bottom surface in the first recess portion, the first reinforcing rib having a slanted cross-section.

For example, the partition wall may further include a second reinforcing rib having a cross-section protruding from a portion surrounding the first through-hole in the partition wall toward the clamping member in the first direction thereof.

For example, the fuel cell may further include a sealer located in the at least one opening at a position at which the enclosure and the partition wall are in contact with each other.

For example, the target end plate may further include a connection portion interconnecting the body and the partition wall.

For example, the body, the partition wall, and the connection portion may be integrated with each other.

For example, the connection portion may be integrated with the partition wall, and may be formed separately from the body.

For example, the partition wall may include a second recess portion formed to face the sealer and to be concavely depressed in a third direction intersecting the first direction, and the enclosure may include a second protruding portion protruding in the third direction to be fitted into the second recess portion at the at least one opening.

For example, the clamping member may include a first portion, disposed on the cell stack and on the body of the target end plate, and a second portion, bent from the first portion and extending toward a space in which the gap is formed. The second portion may have a second through-hole formed therein to allow the coupling screw to pass therethrough, the second through-hole being located to face a portion of the first through-hole.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
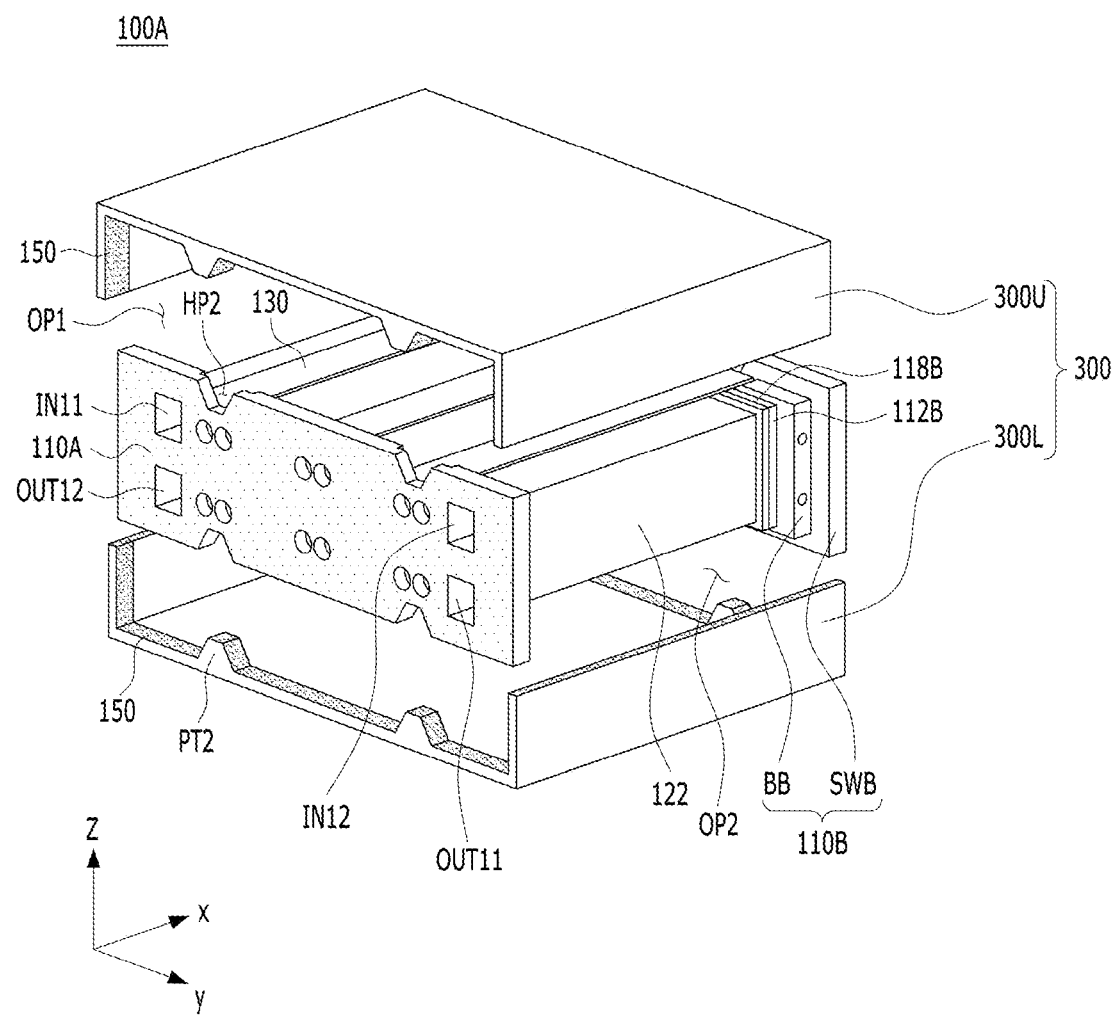
FIG. 1A is an exploded perspective view of a fuel cell according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The present invention will now be described more fully hereinafter with reference to the accompanying drawings, in which various embodiments are shown. The examples, however, may be embodied in various forms and should not be construed as being limited to the exemplary embodiments set forth herein. Rather, these embodiments are provided so that this disclosure will be more thorough and complete, and will more fully convey the scope of the present invention to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

Furthermore, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, fuel cells 100A and 100B according to exemplary embodiments will be described with reference to the accompanying drawings. The fuel cells 100A and 100B will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the exemplary embodiments are not limited thereto. That is, the x-axis, the y-axis, and the z-axis may intersect each other obliquely. For convenience of description, the +x-axis direction or the —x-axis direction will be referred to as a "first direction", the +y-axis direction or the −y-axis direction will be referred to as a "2-$1^{st}$ direction", the +z-axis direction or the −z-axis direction will be referred to as a "2-$2^{nd}$ direction", and at least one of the 2-$1^{st}$ direction or the 2-$2^{nd}$ direction will be referred to as a "second direction".

Figure 1B:
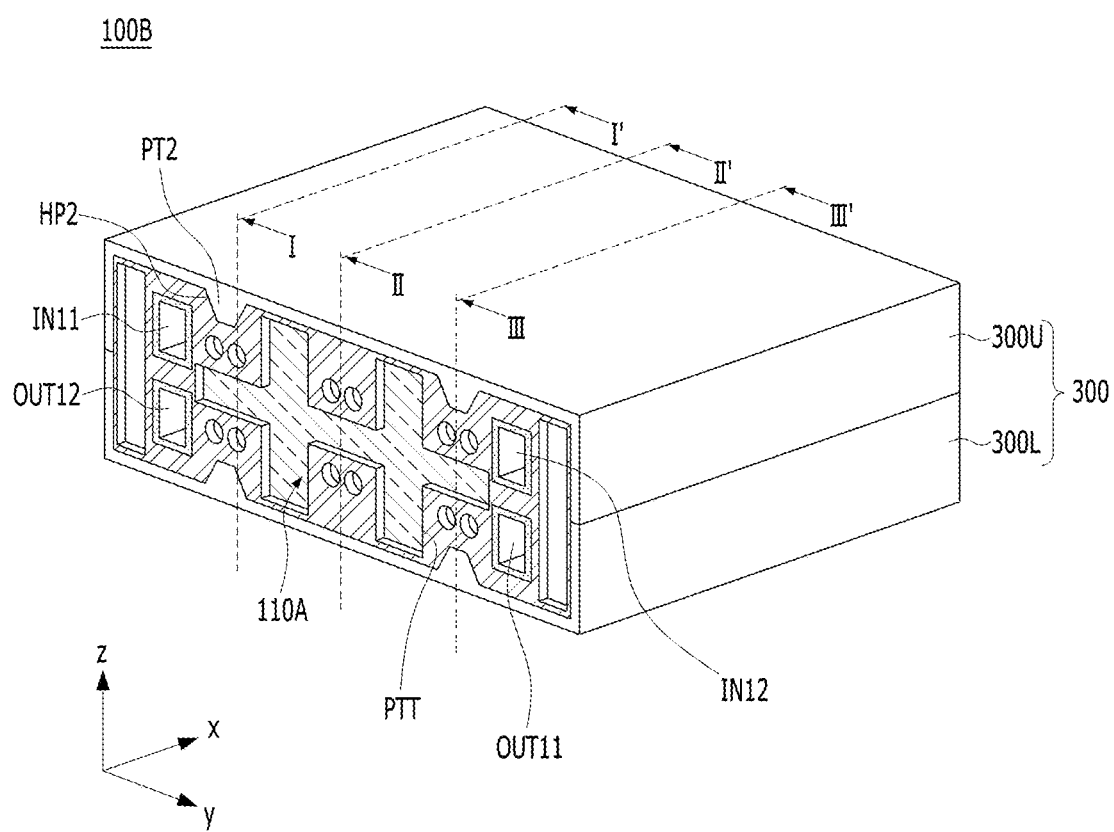
FIG. 1B is a perspective view showing the assembled state of a fuel cell according to another exemplary embodiment of the present invention.
Figure 2:
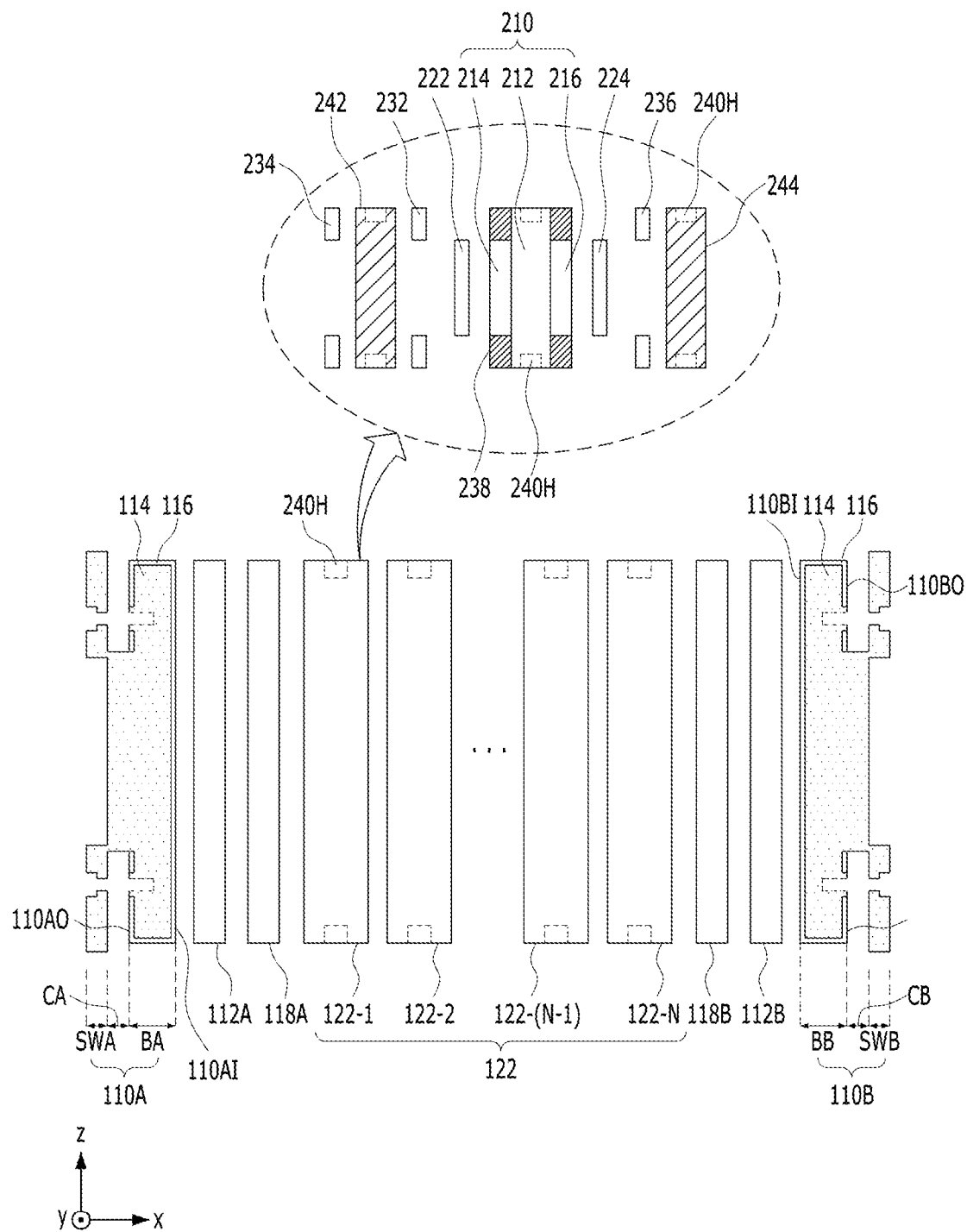
FIG. 2 is a cross-sectional view of an exemplary embodiment of end plates and a cell stack of the fuel cell.
Figure 3:
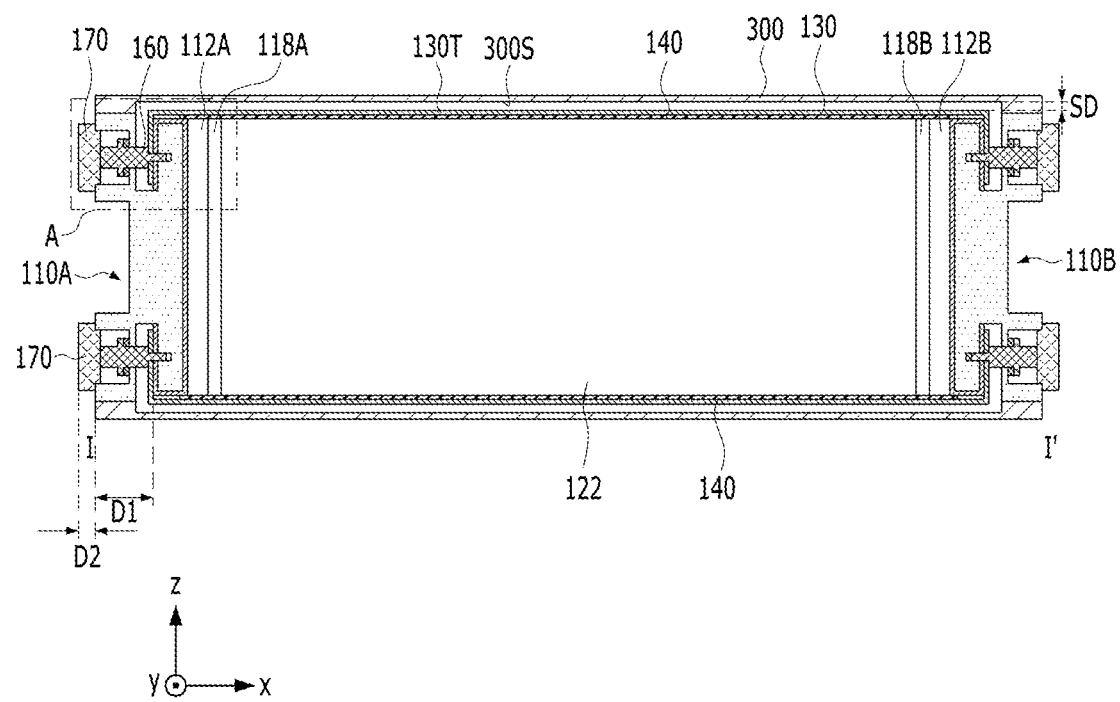
FIG. 3 is a cross-sectional view taken along line I-I' shown in FIG. 1B.
Figure 4A:
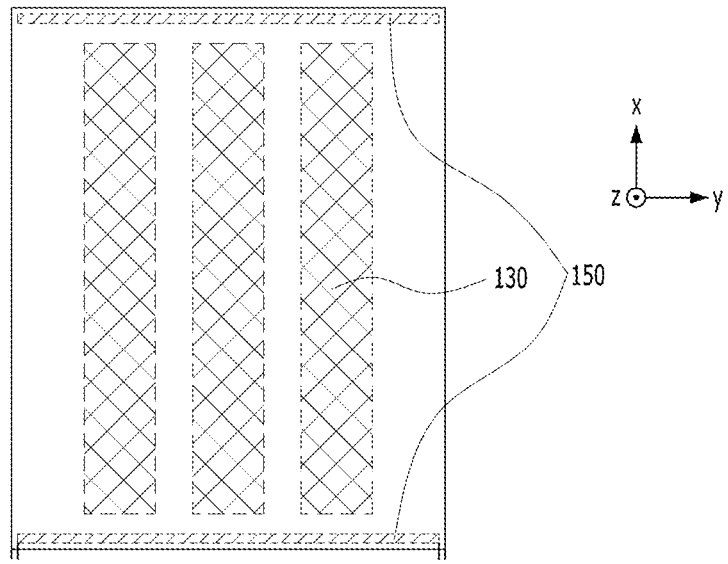
FIG. 4A and FIG. 4B are, respectively, a plan view and a front view of the fuel cell according to the exemplary embodiment shown in FIG. 1A.
Figure 4B:
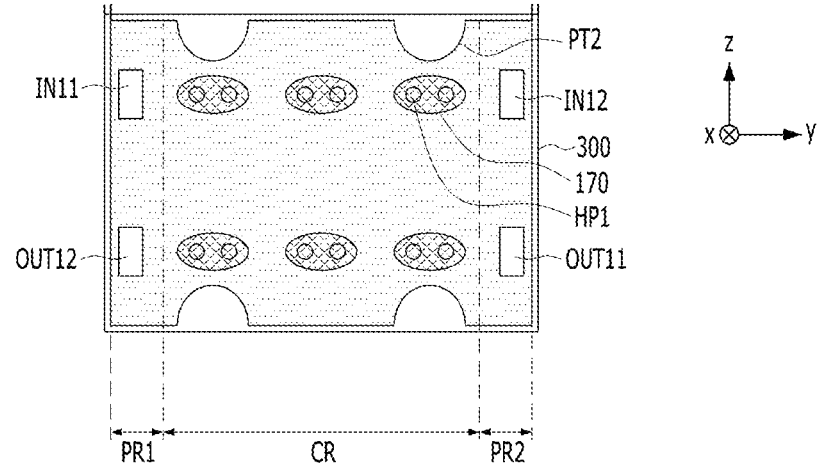
Figure 5:
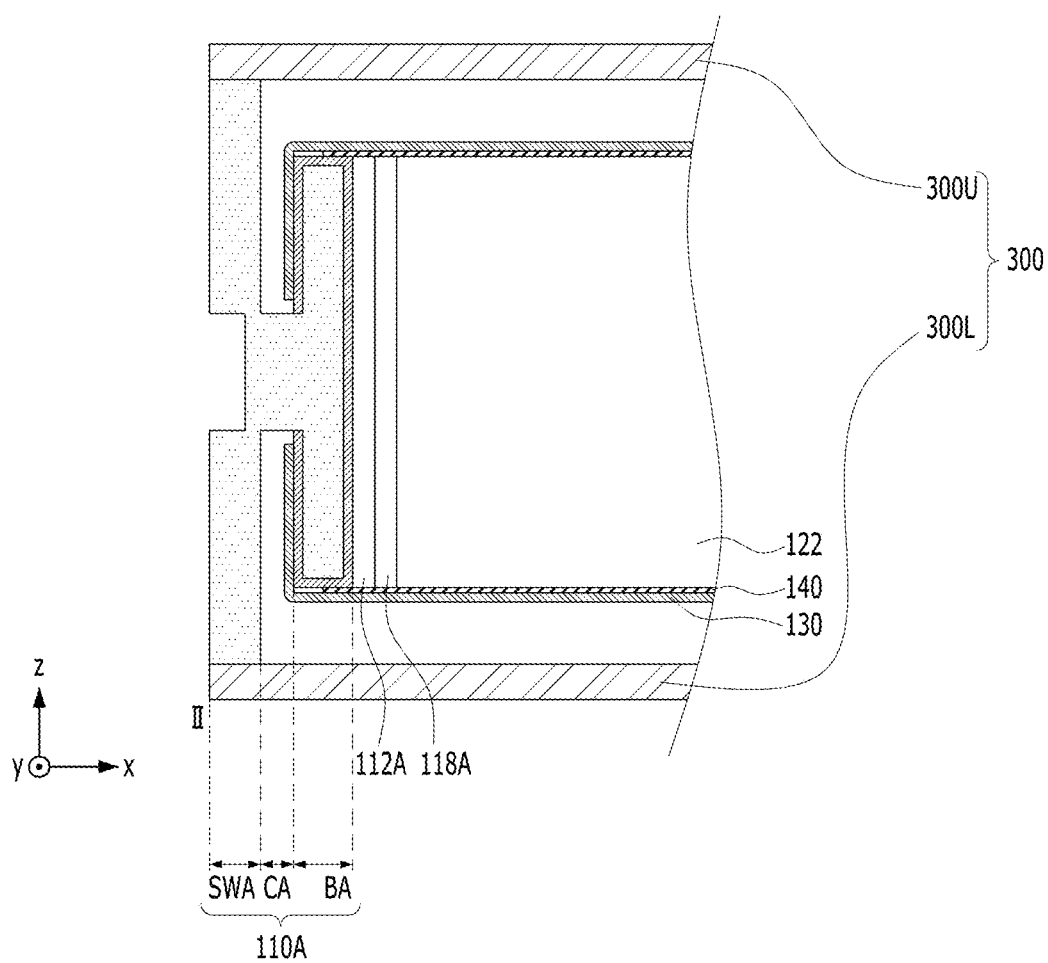
FIG. 5 is a cross-sectional view taken along line II-II' shown in FIG. 1B.
Figure 6:
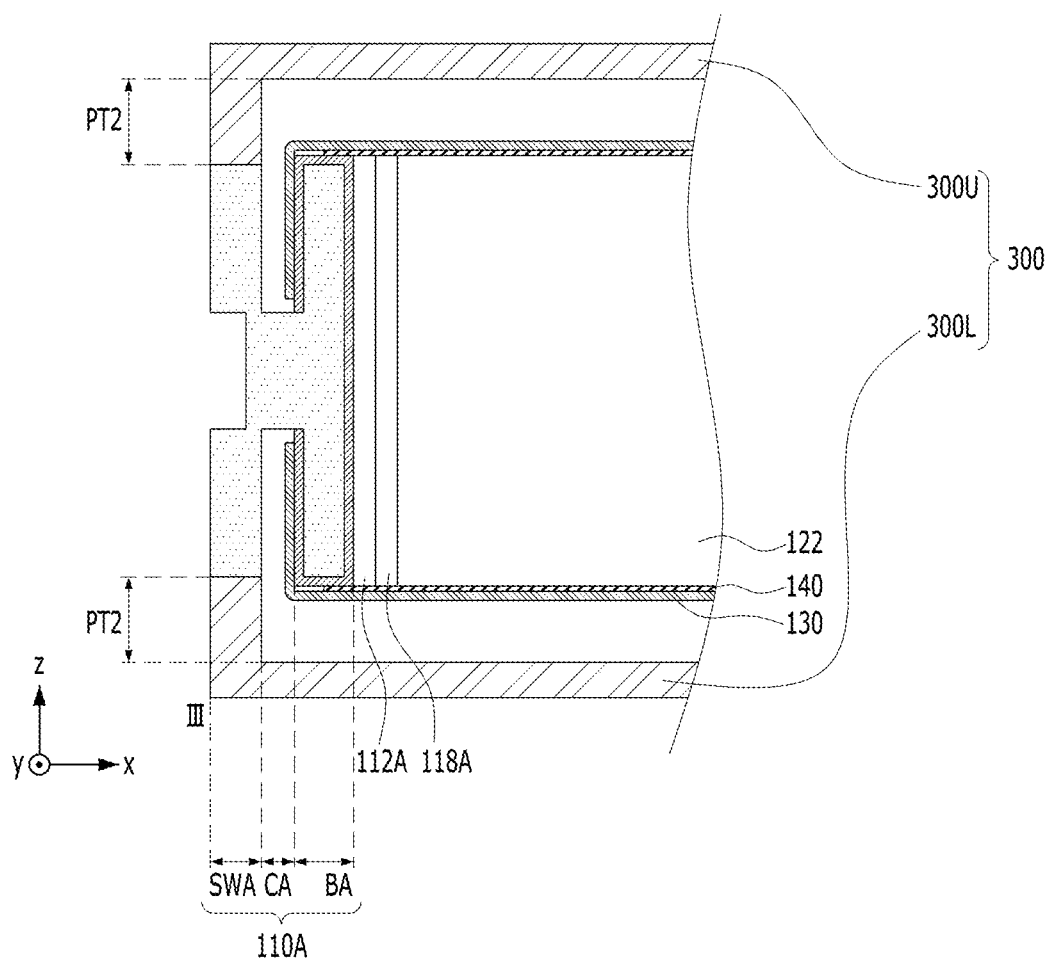
FIG. 6 is a cross-sectional view taken along line III-III' shown in FIG. 1B.
Figure 7:
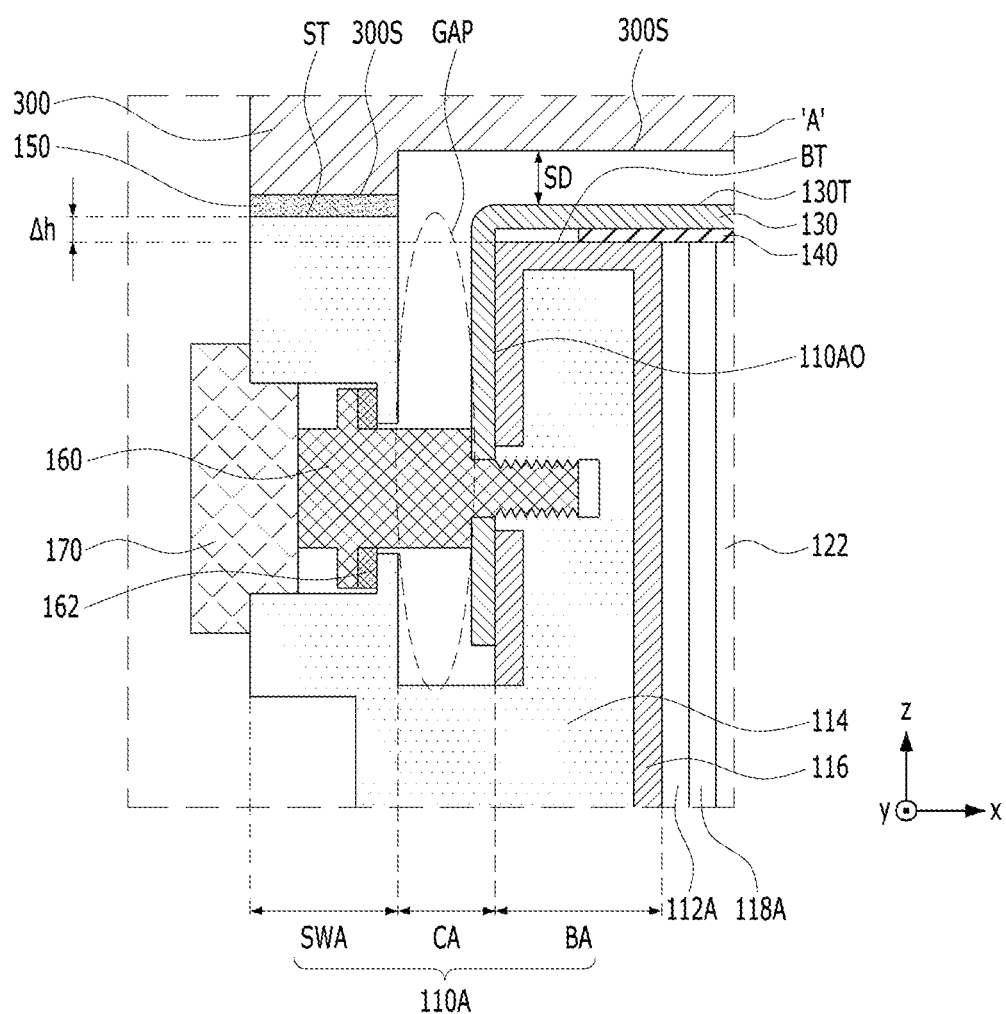
FIG. 7 is an enlarged cross-sectional view showing the mounted state of an exemplary embodiment of portion "A" shown in FIG. 3.
Figure 8:
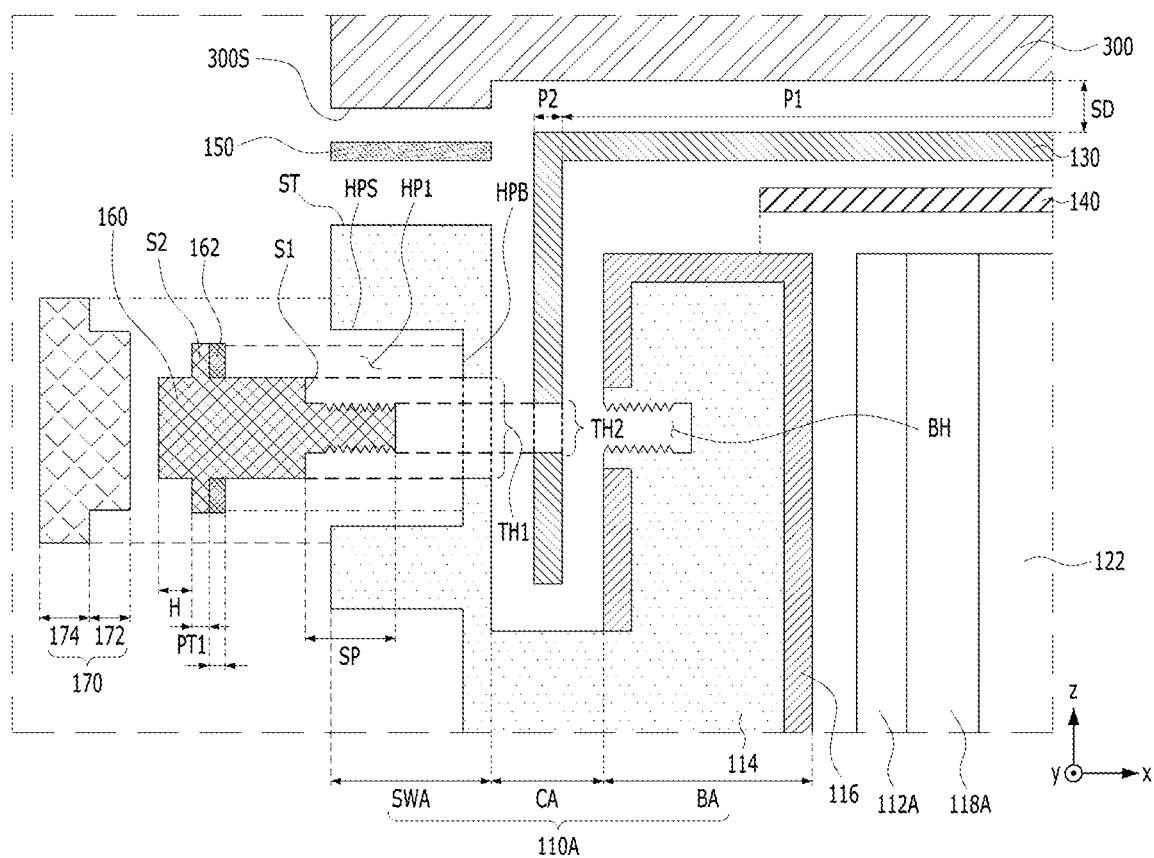
FIG. 8 is an enlarged cross-sectional view showing the disassembled state of portion "A" shown in FIG. 3.

FIG. 1A is an exploded perspective view of a fuel cell 100A according to various exemplary embodiments of the present invention, FIG. 1B is a perspective view showing the assembled state of a fuel cell 100B according to another exemplary embodiment of the present invention, FIG. 2 is a cross-sectional view of an exemplary embodiment of end plates (pressing plates or compressing plates) 110A and 110B and a cell stack 122 of the fuel cell 100A or 100B, FIG. 3 is a cross-sectional view taken along line I-I' shown in FIG. 1B, FIG. 4A and FIG. 4B are, respectively, a plan view and a front view of the fuel cell 100A according to the exemplary embodiment shown in FIG. 1A, FIG. 5 is a cross-sectional view taken along line II-II' shown in FIG. 1B, FIG. 6 is a cross-sectional view taken along line III-III' shown in FIG. 1B, FIG. 7 is an enlarged cross-sectional view showing the assembled state of an exemplary embodiment A1 of portion "A" shown in FIG. 3, and FIG. 8 is an enlarged cross-sectional view showing the disassembled state of portion "A" shown in FIG. 3.

Each of the fuel cells 100A and 100B may be, for example, a polymer electrolyte membrane fuel cell (or a proton exchange membrane fuel cell) (PEMFC), which has been studied most extensively as a power source for driving vehicles. However, the exemplary embodiments are not limited to any specific form of fuel cell.

The fuel cell 100A may include first and second end plates 110A and 110B and a cell stack 122.

The cell stack 122 may include a plurality of unit cells, which are stacked in the first direction thereof. Referring to FIG. 2, the cell stack 122 may include a plurality of unit cells 122-1 to 122-N, which are stacked in the first direction thereof. Here, "N" is a positive integer of 1 or greater, and may range from several tens to several hundreds.

Each unit cell 122-$n$ may generate 0.6 volts to 1.0 volts of electricity. Here, $1 \le n \le N$. "N" may be determined depending on the intensity of the power to be supplied from the fuel cell 100A or 100B to a load. Here, "load" may refer to a portion of a vehicle that requires power.

Each unit cell 122-$n$ may include a membrane electrode assembly (MEA) 210, gas diffusion layers (GDLs) 222 and 224, first to third gaskets 232, 234, and 236, and separators (or bipolar plates) 242 and 244.

The membrane electrode assembly 210 has a structure in which catalyst electrode layers, in which electrochemical reactions occur, are attached to both sides of an electrolyte membrane through which hydrogen ions move. The membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. Furthermore, the membrane electrode assembly 210 may further include a sub-gasket 238. The polymer electrolyte membrane 210 is disposed between the fuel electrode 214 and the air electrode 216. Hydrogen, which is the fuel in the fuel cell 100A or 100B, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. The hydrogen ions alone may be selectively transferred to the air electrode 216 through the polymer electrolyte membrane 212, and at the same time, the electrons may be transferred to the air electrode 216 through the gas diffusion layers 222 and 224 and the separators 242 and 244, which are conductors. To realize the above operation, a catalyst layer may be applied to each of the fuel electrode 214 and the air electrode 216. The movement of the electrons described above causes the electrons to flow through an external wire, thus generating current. That is, the fuel cell 100A or 100B may generate power due to the electrochemical reaction between hydrogen, which is the fuel, and oxygen contained in the air.

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 are configured to uniformly distribute hydrogen and oxygen, which are reactant gases, and to transfer the generated electrical energy. To the present end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216. The first gas diffusion layer 222 is configured to diffuse and uniformly distribute hydrogen, supplied as a reactant gas, through the first separator 242, and may be electrically conductive. The second gas diffusion layer 224 is configured to diffuse and uniformly distribute air, supplied as a reactant gas, through the second separator 244, and may be electrically conductive.

The first to third gaskets 232, 234, and 236 is configured to maintain the airtightness and clamping pressure of the cell stack at an appropriate level with respect to the reactant gases and the coolant, to disperse the stress when the separators 242 and 244 are stacked, and to independently seal the flow paths. Accordingly, since airtightness and watertightness are maintained by the first to third gaskets 232, 234, and 236, the flatness of the surfaces that are adjacent to the cell stack 122, which generates power, may be secured, and thus surface pressure may be distributed uniformly over the reaction surface of the cell stack 122.

The separators 242 and 244 is configured to move the reactant gases and the cooling medium and to separate each of the unit cells from the other unit cells. Furthermore, the separators 242 and 244 is configured to structurally support the membrane electrode assembly 210 and the gas diffusion layers 222 and 224 and to collect the generated current and transfer the collected current to current-collecting plates 118A and 118B.

The current-collecting plates 118A and 118B may be disposed between the cell stack 122 and the internal surfaces 110AI and 110BI of the first and second end plates 110A and 110B that face the cell stack 122. The current-collecting plates 118A and 118B are configured to collect electrical energy generated by the flow of electrons in the cell stack 122 and to supply the electrical energy to a load of a vehicle that utilizes the fuel cell 100A or 100B.

The separators 242 and 244 may be disposed outside the gas diffusion layers 222 and 224, respectively. That is, the first separator 242 may be disposed on the left side of the first gas diffusion layer 222, and the second separator 244 may be disposed on the right side of the second gas diffusion layer 224. The first separator 242 is configured to supply hydrogen as a reactant gas to the fuel electrode 214 through the first gas diffusion layer 222. To the present end, the first separator 242 may include an anode plate (AP), in which channels (passages or flow paths) through which hydrogen flows are formed. The second separator 244 is configured to supply air as a reactant gas to the air electrode 216 through the second gas diffusion layer 224. To the present end, the second separator 244 may include a cathode plate (CP), in which channels through which air containing oxygen flows are formed. Furthermore, each of the first and second separators 242 and 244 may form channels through which a cooling medium (e.g., coolant) flows. Furthermore, the separators 242 and 244 may be formed of a graphite-based material, a composite graphite-based material, or a metal-based material. However, the exemplary embodiments are not limited to any specific material of the separators 242 and 244.

Furthermore, as shown in FIG. 2, the fuel cell 100A or 100B may further include a first end portion cell heater (or a first heater plate) 112A, which is disposed between the cell stack 122 and the first end plate 110A, and a second end portion cell heater (or a second heater plate) 112B, which is disposed between the cell stack 122 and the second end plate 110B.

The first and second end plates 110A and 110B may be disposed at respective end portions of the cell stack 122, and may support and fix the plurality of unit cells. That is, the first end plate 110A may be disposed at one end portion of the cell stack 122, and the second end plate 110B may be disposed at the opposite end portion of the cell stack 122.

The first end plate 110A may include a plurality of manifolds (or communication portions). For example, as shown in FIGS. 1A, 1B, and 4B, the first end plate 110A may include a plurality of manifolds IN11, IN12, OUT11, and OUT12.

Reactant gas required for the membrane electrode assembly 210 may be introduced through the first and second inlet communication portions IN11 and IN12, and gas or liquid to which reactant gas, which is humidified and supplied, and condensate water generated in the cell are added may be discharged outside the fuel cell 100A through the first and second outlet communication portions OUT11 and OUT12.

Furthermore, the second end plate 110B may also include a plurality of manifolds (or communication portions). For example, although not illustrated, the second end plate 110B may include a plurality of manifolds (or communication portions) IN13 and OUT13. A cooling medium may be introduced into the cell stack 122 from the outside thereof through the third inlet communication portion IN13, and the cooling medium may be discharged outside from the inside of the cell stack 122 through the third outlet communication portion OUT13. Alternatively, unlike the configuration shown in the drawings, the third inlet communication portion IN13 may be disposed between the first inlet communication portion IN11 and the second outlet communication portion OUT12 in the first end plate 110A, and the third outlet communication portion OUT13 may be disposed between the second inlet communication portion IN12 and the first outlet communication portion OUT11 in the first end plate 110A.

According to the exemplary embodiment of the present invention, the fuel cell 100A or 100B may further include an insulating plate 140. The insulating plate 140 is disposed between the cell stack 122 and the clamping member 130, and is configured to electrically insulate the cell stack 122 and the clamping member 130 from each other.

Furthermore, the fuel cell 100A or 100B may further include an enclosure 300.

According to various exemplary embodiments of the present invention, the enclosure 300 may be a four-sided enclosure that covers the side portions of the cell stack 122 and includes first and second openings OP1 and OP2 to expose respective end portions of the cell stack 122 therethrough. In the instant case, the first end plate 110A may be disposed at the first opening OP1 in the enclosure 300, and the second end plate 110B may be disposed at the second opening OP2 in the enclosure 300.

In the instant case, the enclosure 300 may be configured so that at least two bodies are coupled to each other. For example, as shown in FIG. 1A and FIG. 1B, the two bodies forming the enclosure 300 may be an upper enclosure 300U and a lower enclosure 300L. The upper enclosure 300U may have a "⌐⌐" shape, and the lower enclosure 300L may have a "⌐⌐" shape.

Alternatively, one of the two bodies of the enclosure 300 may have a "⊏" shape, and the other one of the two bodies of the enclosure 300 may have a "|" shape so that the two bodies are coupled to each other.

Alternatively, the upper enclosure 300U and the lower enclosure 300L may be integrated with each other.

According to another exemplary embodiment of the present invention, the enclosure 300 may be a five-sided enclosure that surrounds any one of the two end portions of the cell stack 122 and the side portions of the cell stack 122 and includes only any one of the first opening OP1 and the second opening OP2. In the instant case, one of the first and second end plates 110A and 110B may be disposed at the end portion of the cell stack 122 that faces one of the openings OP1 and OP2 in the enclosure 300, and the other one of the first and second end plates 110A and 110B may be disposed between the opposite end portion of the cell stack 122 and the enclosure 300.

Hereinafter, among the first and second end plates 110A and 110B, the end plate disposed at the opening OP1 or OP2 in the enclosure 300 will be referred to as a "target end plate". That is, when the enclosure 300 is a four-sided enclosure, each of the first and second end plates 110A and 110B, which is disposed at a respective one of the first and second openings OP1 and OP2, may be a target end plate. Alternatively, when the enclosure 300 is a five-sided enclosure, among the first and second end plates 110A and 110B, the end plate disposed at any one of the first and second openings OP1 and OP2 may be a target end plate.

Hereinafter, the following description will be made with reference to the case in which each of the first and second end plates 110A and 110B is a target end plate. However, the following description may also apply to the case in which only one of the first and second end plates 110A and 110B is a target end plate.

Each of the first and second end plates 110A and 110B may be formed by coupling a plurality of plates to each other.

The first end plate 110A may include a body BA, and the body BA may include an internal surface 110AI, which faces the cell stack 122, and an external surface 110AO formed opposite to the internal surface 110AI. The second end plate 110B may include a body BB, and the body BB may include an internal surface 110BI, which faces the cell stack 122, and an external surface 110BO formed opposite to the internal surface 110BI.

Furthermore, each of the bodies BA and BB of the first and second end plates 110A and 110B may include a core 114 and a clad 116. The core 114 may have first rigidity, and the clad 116 may have second rigidity which is lower than the first rigidity, and may envelop at least a portion of the core 114. For example, the core 114 may be a metal insert including a metal material, and the clad 116 may include insulative resin, for example, plastic. The core 114 of each of the first and second end plates 110A and 110B may be highly rigid to withstand internal surface pressure, and may be implemented by machining a metal material.

Alternatively, each of the bodies BA and BB of the first and second end plates 110A and 110B may be formed such that the metal insert 114 is enveloped by the plastic injection-molded product 116. In the case in which the core 114, which is a metal insert, has rigidity higher than the rigidity of the clad 116, a coupling screw 160 may be securely fastened to the core 114, which is the metal insert of each of the first and second end plates 110A and 110B, as will be described later.

When the enclosure 300 is a four-sided enclosure that includes the first and second openings OP1 and OP2, each of partition walls SWA and SWB may be spaced from at least a portion of a corresponding one of the external surfaces 110AO and 110BO of the bodies BA and BB in the first direction, so a gap may be formed therebetween.

The fuel cell 100A shown in FIG. 1A has the same configuration as the fuel cell 100B shown in FIG. 1B, except that the partition walls SWA and SWB of the fuel cell 100A are shaped differently from those of the fuel cell 100B. When the partition walls SWA and SWB are formed to have the pattern PTT shown in FIG. 1B (e.g., a cross-shaped pattern), the weight occupied by the partition walls SWA and SWB in the fuel cell 100B may be reduced, compared to when the partition walls SWA and SWB are formed in the shape shown in FIG. 1A. However, the exemplary embodiments are not limited to any specific shape of the partition walls SWA and SWB.

Furthermore, the fuel cell 100A or 100B may further include a sealer 150.

The sealer 150 may seal the cell stack 122 together with the enclosure 300, protecting the cell stack 122 from at least one of external water, dust, or heat. To the present end, the sealer 150 may be located in at least one opening OP1 or OP2 at a position at which the enclosure 300 and the partition wall SWA or SWB of the target end plate are in contact with each other. For example, referring to FIGS. 1A, 7, and 8, the sealer 150 may be disposed at each of the portions of the upper enclosure 300U that are in contact with the partition walls SWA and SWB and with the lower enclosure 300L.

The sealer 150 may be formed such that a liquid-state material thereof is applied to the surface 300S of the enclosure 300 that faces the partition walls SWA and SWB or the surfaces ST of the partition walls SWA and SWB that face the enclosure 300 and is then transformed into a solid state through a curing process. For example, the sealer 150 may be made of silicon or butyl, but the exemplary embodiments are not limited thereto.

When the enclosure 300 is a five-sided enclosure that includes only the first opening OP1, the first end plate 110A disposed at the first opening OP1 is a target end plate. In the instant case, the partition wall SWA is spaced from at least a portion of the external surface 110AO of the body BA in the first direction, so a gap is formed therebetween. The sealer 150 seals the cell stack 122 together with the enclosure 300. In the present way, the sealer 150 is disposed between the partition wall SWA and the enclosure 300.

Alternatively, when the enclosure 300 is a five-sided enclosure that includes only the second opening OP2, the second end plate 110B disposed at the second opening OP2 is a target end plate. In the instant case, the partition wall SWB is spaced from at least a portion of the external surface 110BO of the body BB in the first direction, so a gap is formed therebetween. The sealer 150 seals the cell stack 122 together with the enclosure 300. In the present way, the sealer 150 is disposed between the partition wall SWB and the enclosure 300.

Accordingly, in the fuel cell 100A or 100B according to the exemplary embodiment of the present invention, the sealer 150 is disposed to block the gaps between the enclosure 300 and the end plates 110A and 11B, forming continuous seal lines (e.g., watertight lines).

Furthermore, the target end plate of the fuel cell 100A or 100B according to the exemplary embodiment may further include a connection portion CA or CB. For example, the connection portion CA of the first end plate 110A may interconnect the body BA and the partition wall SWA, and the connection portion CB of the second end plate 110B may interconnect the body BB and the partition wall SWB.

The enclosure 300 may be made of a metal material, and as described above, the core 114 of each of the bodies BA and BB may be made of the same metal material as that of the enclosure 300.

According to various exemplary embodiments of the present invention, as illustrated in FIGS. 2, 3, and 5 to 8, the body BA or BB and the partition wall SWA or SWB may be integrated with each other. For example, as illustrated, the core 114 of the body BA or BB, the partition wall SWA or SWB, and the connection portion CA or CB may be integrated with each other.

Figure 9:
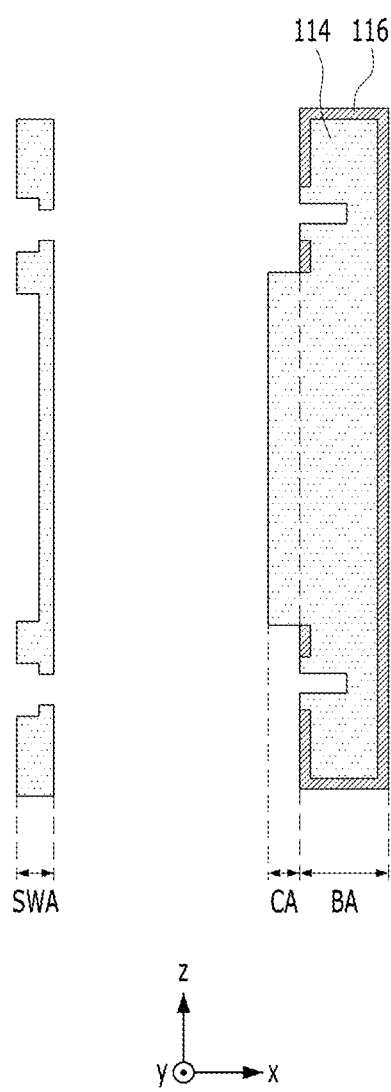
FIG. 9 is a cross-sectional view showing an exemplary coupling relationship between a connection portion, a body, and a partition wall.

FIG. 9 is a cross-sectional view showing an exemplary coupling relationship between the connection portion CA, the body BA, and the partition wall SWA.

Figure 10:
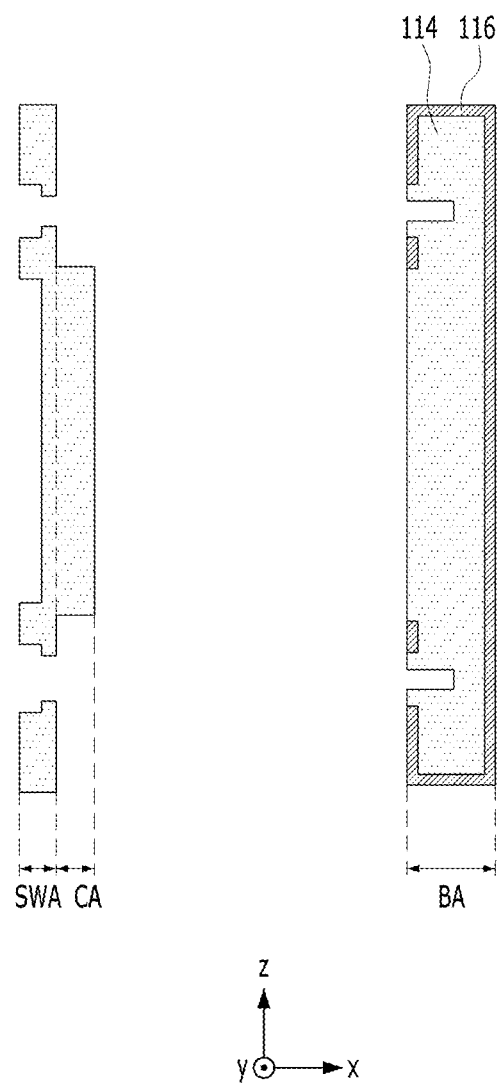
FIG. 10 is a cross-sectional view showing another exemplary coupling relationship between the connection portion, the body, and the partition wall.

FIG. 10 is a cross-sectional view showing another exemplary coupling relationship between the connection portion CA, the body BA, and the partition wall SWA.

Although not shown, the following description of the coupling relationships between the connection portion CA, the body BA, and the partition wall SWA shown in FIG. 9 and FIG. 10 may also apply to the coupling relationships between the connection portion CB, the body BB, and the partition wall SWB.

According to another exemplary embodiment of the present invention, as shown in FIG. 9 and FIG. 10, the body BA or BB and the partition wall SWA or SWB may be formed separately from each other.

In one example, the connection portion CA or CB may be integrated with the body BA or BB, and may be formed separately from the partition wall SWA or SWB. Here, the connection portion CA or CB protruding from the body BA or BB may be coupled to the partition wall SWA or SWB. For example, as shown in FIG. 9, the connection portion CA may be integrated with the body BA, and may be formed separately from the partition wall SWA. Here, the connection portion CA protruding from the body BA may be coupled to the partition wall SWA.

In another example, the connection portion CA or CB may be integrated with the partition wall SWA or SWB, and may be formed separately from the body BA or BB. For example, as shown in FIG. 10, the connection portion CA may be integrated with the partition wall SWA, and may be formed separately from the body BA. Here, the connection portion CA protruding from the partition wall SWA may be coupled to the body BA.

According to various exemplary embodiments of the present invention, the connection portion CA or CB may be omitted. For example, as shown in FIG. 1A, the connection portion CB may be omitted. In the instant case, the partition wall SWA or SWB may be directly coupled to the body BA or BB.

Furthermore, the external surface 110AO or 110BO of the body BA or BB may include a "non-manifold area" and a "manifold area". The "non-manifold area" may be defined as an area of the body BA or BB in which no manifold is disposed, and the "manifold area" may be defined as an area of the body BA or BB in which a manifold is disposed.

The above-described partition wall SWA or SWB may be coupled to the non-manifold area of the body BA or BB, and may not be coupled to the manifold area of the body BA or BB. The reason for this is to prevent the partition wall SWA or SWB from impeding the flow of fluid through the manifold. For example, in the fuel cell 100A or 100B according to the exemplary embodiment described above, the central area CR of the body BA or BB may be the non-manifold area, and the peripheral areas PR1 and PR2 of the body BA or BB, which are located at the periphery of the central area CR of the body BA or BB, may be the manifold areas. Accordingly, the partition wall SWA or SWB may be coupled to the central area CR of the body BA or BB, and may not be coupled to the peripheral areas PR1 and PR2. However, the manifold may be located at any of various positions in the separators 242 and 244 and the end plates 110A and 110B. In consideration thereof, in the fuel cell 100A or 100B according to the exemplary embodiment of the present invention, the partition wall SWA or SWB may be coupled to any portion of the body BA or BB, when the portion is within the non-manifold area, in which no manifold is disposed. For example, unlike what is illustrated in FIG. 6, when the central area CR of the body BA or BB is the manifold area and the peripheral areas PR1 and PR2 are the non-manifold areas, the partition wall SWA or SWB may be coupled to the peripheral areas PR1 and PR2 of the body BA or BB.

For convenience of description, the following description will be made with reference to the case in which the central area CR is the non-manifold area and the peripheral areas PR1 and PR2 are the manifold areas, but the following description may also apply to the case in which the central area CR is the manifold area and the peripheral areas PR1 and PR2 are the non-manifold areas.

Furthermore, in the fuel cell 100A or 100B according to the exemplary embodiment of the present invention, there may be a height difference $\Delta h$ between the first top surface of the body BA or BB of the first or second end plate 110A or 110B and the second top surface of the partition wall SWA or SWB. For example, referring to FIG. 7, in the case of the fuel cell 100B according to the exemplary embodiment of the present invention, there may be a height difference $\Delta h$ between the first top surface BT and the second top surface ST. That is, the first top surface BT may be lower than the second top surface ST by the height difference $\Delta h$ on the basis of the ground.

In the case of the fuel cell according to the other embodiment, there may be no height difference between the first top surface BT and the second top surface ST. That is, the first top surface BT and the second top surface ST may be located at the same height.

Furthermore, the partition wall SWA or SWB may be formed in any of various shapes.

According to various exemplary embodiments of the present invention, the body BA or BB (e.g., the core 114) and the partition wall SWA or SWB are injection-molded together using insert overmolding and molds, whereby the core 114 of the body BA or BB and the partition wall SWA or SWB may be formed integrally with each other.

According to another exemplary embodiment of the present invention, the partition wall SWA or SWB may be physically coupled to the body BA or BB by welding the partition wall SWA or SWB to the body BA or BB through a vibration welding or laser welding method. In the instant case, a conventional body having no partition wall may be recycled to manufacture a fuel cell including the partition wall SWA or SWB.

Furthermore, the fuel cell 100A according to the exemplary embodiment may further include a clamping member 130.

The clamping member 130 is configured to clamp a plurality of unit cells in the first direction together with the first and second end plates 110A and 110B.

Furthermore, referring to FIGS. 3 and 7, the clamping member 130 and the enclosure 300 may be spaced from each other. The reason for this is to electrically insulate the clamping member 130 and the enclosure 300 from each other. For example, the upper surface 130T of the clamping member 130 and the internal surface 300S of the enclosure 300, which faces the clamping member 130 in the 2-2$^{nd}$ direction, may be spaced a predetermined distance SD apart from each other.

For example, as shown in FIGS. 1A and 4, the clamping member 130 may have a bar shape, but the exemplary embodiments are not limited thereto. That is, according to another exemplary embodiment of the present invention, the clamping member 130 may be formed in a long bolt shape, a belt shape, or a rigid rope shape to clamp the plurality of unit cells. When the clamping member 130 is formed in a bar shape, it is possible to reduce the height of the fuel cell 100A or 100B in the 2-2$^{nd}$ direction, compared to when the clamping member 130 is formed in a long bolt shape.

An example of fastening the clamping member 130 to the fuel cell 100A or 100B will now be described.

The first and second end plates 110A and 110B may be disposed at the respective end portions of the cell stack 122, in which a plurality of unit cells is repeatedly stacked. The present assembly may be placed in clamping equipment, and an appropriate load may be applied thereto. In the instant state, the cell stack 122 may be secured to the first and second end plates 110A and 110B using the clamping member 130.

The clamping member 130 may include first and second portions P1 and P2. For example, referring to FIGS. 7 and 8, the first portion P1 may be disposed on the cell stack 122 and on the target end plate, for example, on each of the bodies BA and BB of the first and second end plates 110A and 110B. The second portion P2 may be bent from the first portion P1 toward the space in which the gap is formed, and may extend to the external surface 110AO or 110BO of the body. At the instant time, the second portion P2 may extend to the portion of the external surface 110AO or 110BO that the coupling screw 160 is provided to penetrate. Accordingly, the second portion P2 of the clamping member 130 may be accommodated in the gap between the external surface 110AO or 110BO of the body BA or BB and the partition wall SWA or SWB.

Furthermore, the fuel cell 100A according to the exemplary embodiment may further include a coupling screw 160.

The coupling screw 160 is configured to couple the target end plate, for example, each of the first and second end plates 110A and 110B, and the clamping member 130 to each other. For example, the coupling screw 160 may penetrate each of the partition walls SWA and SWB, may then penetrate the clamping member 130 via the gap, and may be inserted into and fixed to the interior of each of the bodies BA and BB. In the present way, the coupling screw 160 may couple the clamping member 130 and each of the bodies BA and BB to each other.

To the present end, each of the bodies BA and BB may include a blind hole BH formed therein. The coupling screw 160 may be fastened into the blind hole BH. The blind hole BH may penetrate the clad 116 and may extend to the core 114.

Furthermore, each of the partition walls SWA and SWB may include therein a first recess portion HP1, in which a first through-hole TH1 is formed to allow the coupling screw 160 to pass therethrough. The first recess portion HP1 may include a second internal surface HPS and a bottom surface HPB. The first through-hole TH1 may be formed in the bottom surface HPB of the first recess portion HP1.

Hereinafter, the coupling screw 160 according to the exemplary embodiment will be described with reference to FIGS. 8, 11A, and 11B, but the exemplary embodiments are not limited thereto.

Figure 11A:
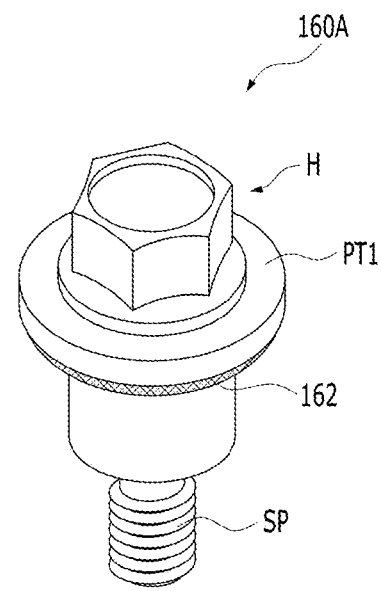
FIG. 11A and FIG. 11B are, respectively, a top perspective view and a bottom perspective view of an exemplary embodiment of a coupling screw.
Figure 11B:
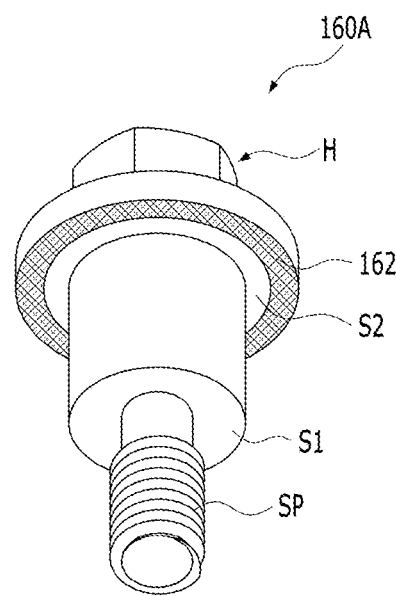

FIG. 11A and FIG. 11B are, respectively, a top perspective view and a bottom perspective view of an exemplary embodiment of the coupling screw 160.

Referring to FIGS. 8, 11A, and 11B, the coupling screw 160 (160A) may include a head H, a first protruding portion PT1, a sealing portion 162, a bearing surface S1, and a threaded portion (or a coupling portion) SP.

The head H is disposed in the first recess portion HP1. The first protruding portion PT1 may protrude from the head H toward the second internal surface HPS of the first recess portion HP1 in the second direction (e.g., at least one of the 2-$1^{st}$ direction or the 2-$2^{nd}$ direction), which intersects the first direction, and may include a sealing seat surface S2, which faces the bottom surface HPB of the first recess portion HP1.

The sealing portion 162 may be disposed between the sealing seat surface S2 and the bottom surface HPB. For example, as shown in FIG. 11B, the sealing portion 162 may be formed in the shape of an O-ring, but the exemplary embodiments are not limited thereto.

The bearing surface S1 may be in contact with the clamping member 130 in the gap. There is a gap (a clearance or a space) between the sealing portion 162, which is disposed underneath the sealing seat surface S2, and the bottom surface HPB. The present gap may be set in consideration of the extent to which the sealing portion 162 is compressed.

If there is no gap between the sealing portion 162 and the bottom surface HPB, the sealing portion 162 may be damaged. However, according to the exemplary embodiment of the present invention, due to the gap between the sealing portion 162 and the bottom surface HPB, the sealing portion 162 may be prevented from being damaged by excessive compression.

On the other hand, the bearing surface S1 and the clamping member 130 may be in contact with each other, without a gap (or a clearance) therebetween. Since the bearing surface S1 and the clamping member 130 are in contact with each other without a gap therebetween, the clamping member 130 and the body BA or BB are securely coupled to each other by the coupling screw 160, whereby coupling reliability may be improved.

Furthermore, the threaded portion SP may be threadedly engaged with the body BA or BB.

Although it is illustrated in FIG. 11A and FIG. 11B that the head H, the first protruding portion PT1, the sealing portion 162, and the threaded portion SP have round shapes, the exemplary embodiments are not limited to any specific shapes of the portions H, PT1, 162, and SP.

When the coupling screw 160 is fastened into the body BA or BB in the first direction, the partition wall SWA or SWB (the bottom surface HPB) may be damaged by the first protruding portion PT1, which is pressed in the first direction thereof. To prevent this, the fuel cell 100A or 100B according to the exemplary embodiment may further include a reinforcing rib.

Figure 12:
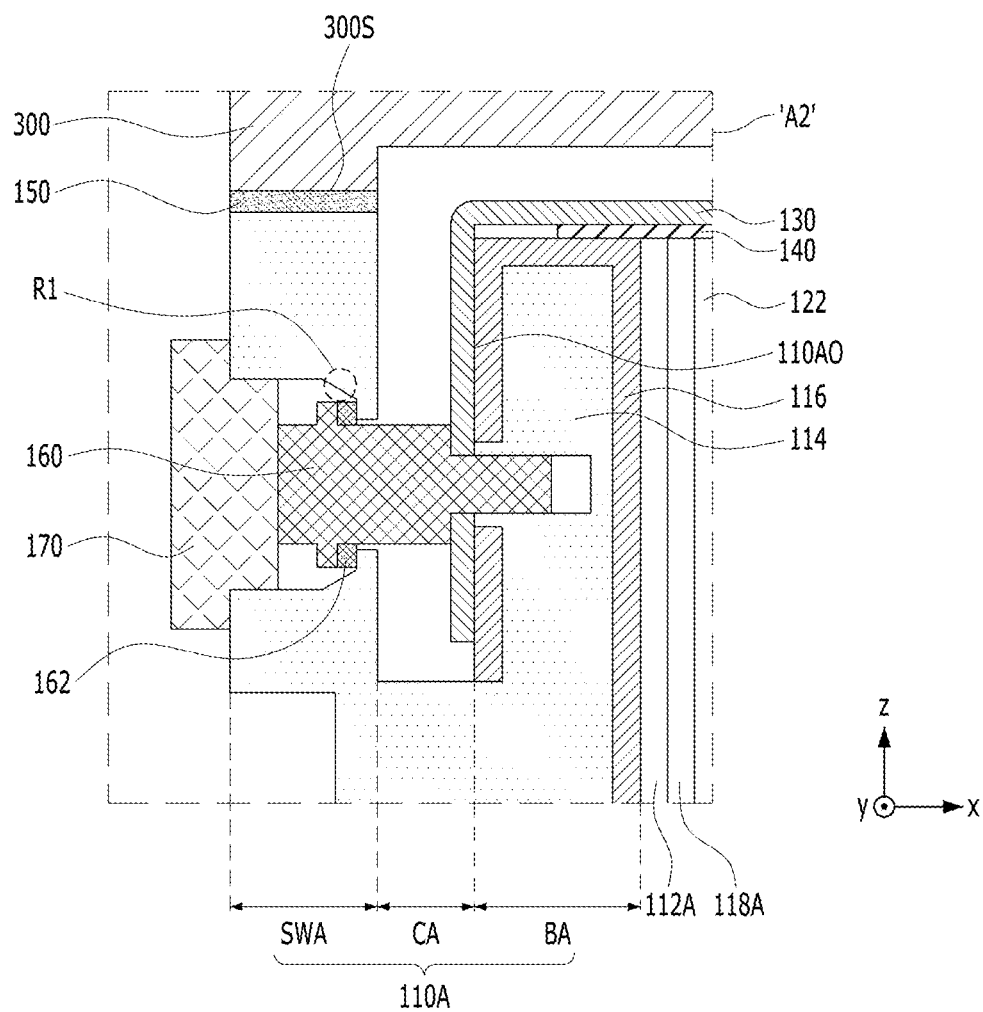
FIG. 12 is an enlarged cross-sectional view showing the assembled state of another exemplary embodiment of portion "A" shown in FIG. 3.
Figure 13:
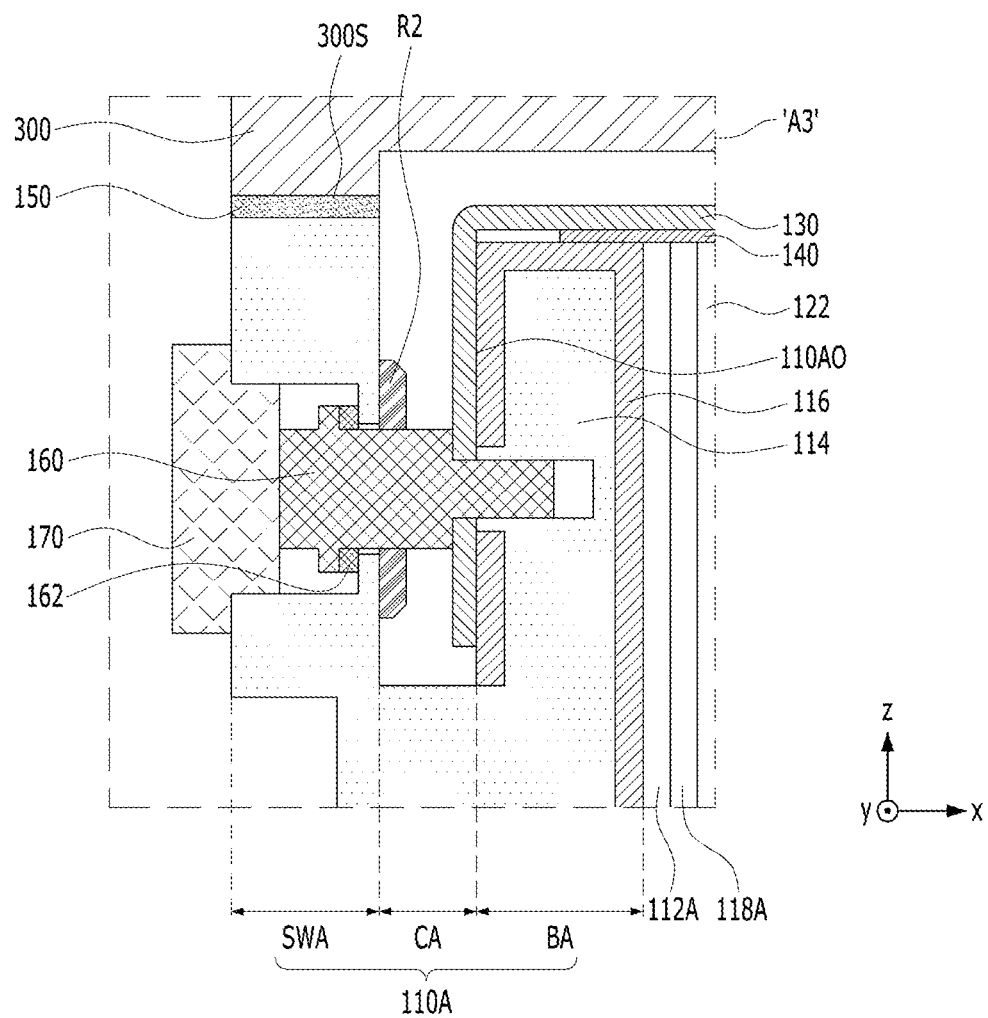
FIG. 13 is an enlarged cross-sectional view showing the assembled state of various exemplary embodiments of portion "A" shown in FIG. 3.

FIG. 12 is an enlarged cross-sectional view showing the assembled state of another exemplary embodiment A2 of portion "A" shown in FIG. 3, and FIG. 13 is an enlarged cross-sectional view showing the assembled state of various exemplary embodiments A3 of portion "A" shown in FIG. 3.

According to various exemplary embodiments of the present invention, the partition wall SWA or SWB may include a first reinforcing rib R1. Referring to FIG. 12, the first reinforcing rib R1 may be located between the second internal surface HPS and the bottom surface HPB in the first recess portion HP1, and may have a slanted cross-sectional shape.

According to another exemplary embodiment of the present invention, the partition wall SWA or SWB may further include a second reinforcing rib. Referring to FIG. 13, the second reinforcing rib R2 may have a cross-sectional shape that protrudes from the portion surrounding the first through-hole TH1 in the partition wall SWA or SWB toward the clamping member 130 in the first direction thereof.

Due to the first or second reinforcing rib R1 or R2, the bottom surface HPB of the partition wall SWA or SWB is less likely to be damaged by the pressure applied by the coupling screw 160.

If not only the clad 116 of the body BA or BB but also the core 114 includes a plastic material to electrically insulate the enclosure 300 and the first or second end plate 110A or 110B, or if the blind hole BH into which the coupling screw 160 is fastened is formed only in the clad 116, rather than extending into the core 114 of the body BA or BB, the coupling force between the coupling screw 160 and the first or second end plate 110A or 110B may be weakened.

However, according to the exemplary embodiment of the present invention, the blind hole BH into which the coupling screw 160 is fastened is formed to extend into the core 114, which is made of a metal material, whereby the coupling force between the coupling screw 160 and the first or second end plate 110A or 110B may be increased.

Furthermore, the fuel cell 100A may further include a cap 170. Referring to FIGS. 3, 4, 7, 8, 12, and 13, the cap 170 may be disposed to cover the coupling screw 160. Although the coupling screw 160 is covered by the cap 170 and is thus hidden, the first recess portion HP1 is indicated by the solid line in FIG. 4, and illustration of the coupling screw 160 is omitted from FIG. 4 for ease of understanding. In the case in which the cap 170 is disposed to cover the coupling screw 160, it is possible to prevent external foreign substances from entering the fuel cell 100A or 100B through the gap between the coupling screw 160 and the partition wall SWA or SWB, further improving a seal.

According to the exemplary embodiment of the present invention, the cap 170 may include a support portion 172 and a cover portion 174. The cover portion 174 is configured to cover the coupling screw 160. The support portion 172 may extend from the cover portion 174 in the first direction to be inserted into the first recess portion HP1. The exemplary embodiments are not limited to any specific cross-sectional shape of the support portion 172.

According to the exemplary embodiment of the present invention, the cap 170 may be made of rubber or a moisture-permeable material. However, the exemplary embodiments are not limited thereto. For example, the cap 170 may be made of EPDM, VQM, fluorine-based rubber, or the like.

Alternatively, the cap 170 may be made of a moisture-permeable material such as Gore-Tex. In the instant case, the moisture in the fuel cell 100A or 100B is discharged to the outside, whereas external moisture is prevented from being introduced into the fuel cell 100A or 100B, maximizing a ventilation effect.

Furthermore, as shown in FIG. 4, the front side of the cap 170 may have an elliptical shape, but the exemplary embodiments are not limited thereto. That is, according to another exemplary embodiment of the present invention, the front side of the cap 170 may have a shape of a circle or a polygonal shape.

Furthermore, according to the exemplary embodiment of the present invention, the second portion P2 of the clamping member 130 may include therein a second through-hole TH2. The second through-hole TH2 may be formed to allow the coupling screw 160 to pass therethrough, and may be disposed to face a portion of the first through-hole TH1. In the present way, in the case in which the coupling screw 160 passes through both the first through-hole TH1 and the second through-hole TH2, which face each other, the fixing force of the coupling screw 160 may be further increased.

Furthermore, the fuel cell 100A or 100B according to the exemplary embodiment may further include a second recess portion HP2 formed in each of the partition walls SWA and SWB and a second protruding portion PT2 formed at the enclosure 300. As shown in FIGS. 1A, 1B, and 4, in each of the first and second openings OP1 and OP2 in the enclosure 300, the second protruding portion PT2 may protrude from each of the upper enclosure 300U and the lower enclosure 300L toward the partition walls SWA and SWB in the 2-2$^{nd}$ direction, and the second recess portion HP2 may be formed in each of the partition walls SWA and SWB to be concavely depressed in the 2-2$^{nd}$ direction to receive the second protruding portion PT2 therein. In the instant case, the second recess portion HP2 and the second protruding portion PT2 may be coupled to each other by the sealer 150. When the second protruding portion PT2 and the second recess portion HP2 are formed as described in connection with the exemplary embodiment of the present invention, the area to which the sealer 150 is applied increases, whereby the coupling force between the enclosure 300 and the partition walls SWA and SWB may be increased compared to when the second protruding portion PT2 and the second recess portion HP2 are not formed.

Hereinafter, a fuel cell according to a comparative example and the fuel cell according to the exemplary embodiment will be described with reference to the accompanying drawings.

Figure 14:
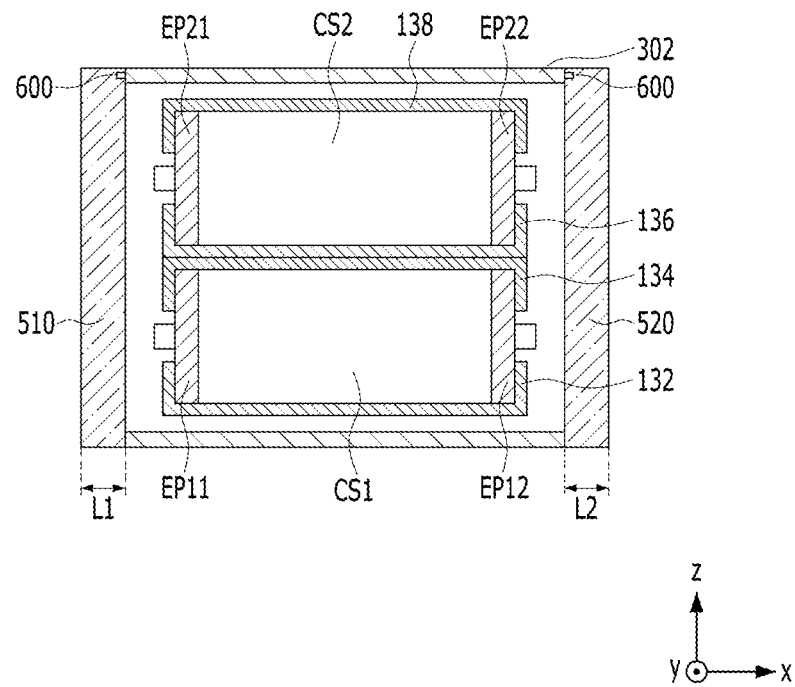
FIG. 14 is a cross-sectional view of a fuel cell according to a first comparative example.

FIG. 14 is a cross-sectional view of a fuel cell according to a first comparative example, which includes first and second stack modules stacked in the 2-2$^{nd}$ direction, an enclosure 302, a manifold block 510, and a side cover 520.

The first stack module shown in FIG. 14 includes a cell stack CS1, first and second end plates EP11 and EP12, and clamping members 132 and 134, and the second stack module includes a cell stack CS2, first and second end plates EP21 and EP22, and clamping members 136 and 138. The cell stacks CS1 and CS2, the clamping members 132, 134, 136, and 138, the first end plates EP11 and EP21, the second end plates EP12 and EP22, and the enclosure 302 perform the same functions as the cell stack 122, the clamping member 130, the first end plate 110A, the second end plate 110B, and the enclosure 300 of the fuel cell 100A or 100B according to the embodiment, respectively.

Hydrogen and air may be supplied to the cell stacks CS1 and CS2 through the manifold block 510 shown in FIG. 14, and coolant may be supplied to the cell stacks CS1 and CS2 through the side cover 520. Furthermore, in the case of the fuel cell according to the first comparative example shown in FIG. 14, high-voltage wiring for series connection (or parallel connection) may be further provided.

Referring to FIG. 14, a watertight line 600 is formed between the manifold block 510 and the enclosure 302 and between the side cover 520 and the enclosure 302. To form the watertight line 600, a space having a size of about 100 mm or more, which corresponds to the sum of the first thickness L1 of the manifold block 510 and the second thickness L2 of the side cover 520, may be unnecessarily required.

Furthermore, in the case of the fuel cell shown in FIG. 14, it may be difficult to secure a watertight structure when a coupling bolt is fastened to the front side thereof.

Figure 15:
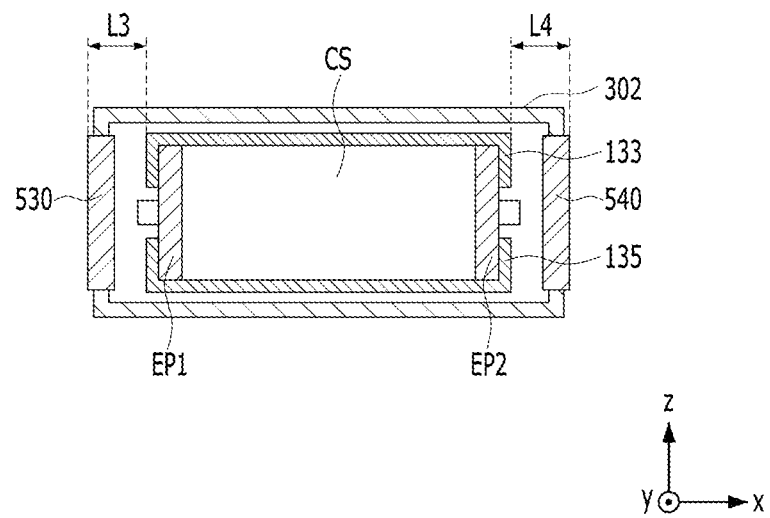
FIG. 15 is a cross-sectional view of a fuel cell according to a second comparative example.

FIG. 15 is a cross-sectional view of a fuel cell according to a second comparative example, which includes a single stack module, an enclosure 302, and side covers 530 and 540.

The stack module shown in FIG. 15 includes a cell stack CS, first and second end plates EP1 and EP2, and clamping members 133 and 135. The cell stack CS, the clamping members 133 and 135, the first end plate EP1, the second end plate EP2, and the enclosure 302 perform the same functions as the cell stack 122, the clamping member 130, the first end plate 110A, the second end plate 110B, and the enclosure 300 of the fuel cell 100A or 100B according to the embodiment, respectively.

To prevent an increase in the size of the space required for mounting the fuel cell in a vehicle, the fuel cell having the configuration shown in FIG. 15 may be used instead of the fuel cell shown in FIG. 14. In the instant case, the number of parts that are required may be reduced. However, the fuel cell according to the second comparative example shown in FIG. 15 requires separate side covers 530 and 540 to seal the fuel cell. When the separate side covers 530 and 540 are provided, a space having a size of about 100 mm or more, which corresponds to the sum of the distance L3 between the side cover 530 and the clamping members 133 and 135 and the distance L4 between the side cover 540 and the clamping members 133 and 135, may be unnecessarily required.

Unlike the first and second comparative examples described above, the fuel cell 100A or 100B according to the exemplary embodiment includes the partition walls SWA and SWB, the connection portions CA and CB, and the cap 170 to seal the cell stack 122. In the instant case, the length of the fuel cell 100A or 100B may be increased by twice the first length D1 in the first direction due to the partition walls SWA and SWB and the connection portions CA and CB, and may be further increased by twice the thickness D2 of the cover portion 174 of the cap 170 in the first direction thereof.

The length of the fuel cell 100A or 100B is increased by twice the length D1 and twice the thickness D2 due to the configurations of the first and second end plates 110A and 110B. For example, when D1 is about 10 mm and D2 is 6 mm to 8 mm, the total increase in the length of the fuel cell 100A or 100B is 32 mm to 36 mm. Thus, it may be seen that the fuel cell according to the exemplary embodiment is shorter in the first direction than the fuel cells according to the first and second comparative examples. Furthermore, when the cap 170 is omitted, the length of the fuel cell in the first direction may be further reduced.

That is, since the partition walls SWA and SWB, which are integrally formed with the bodies BA and BB of the end plates 110A and 110B and extend from the bodies BA and BB, or the partition walls SWA and SWB, which are formed separately from the bodies BA and BB and are coupled to the bodies BA and BB, are coupled to the enclosure 300, the fuel cell 100A or 100B according to the exemplary embodiment does not require separate side covers (refer to 530 and 540 in FIG. 15), and thus the length of the fuel cell in the first direction may be reduced.

Furthermore, since the fuel cell 100A or 100B according to the exemplary embodiment has a smaller height than the fuel cell according to the first comparative example shown in FIG. 14, the same may be easily used in a vehicle in which packaging of components is greatly restricted, like a passenger car, a high-performance vehicle, or the like. That is, in the case of the fuel cell according to the exemplary embodiment of the present invention, since the "⊏"-shaped clamping member 130 is disposed at the cell stack 122, dead space may be minimized or removed.

Furthermore, unlike the first comparative example, which requires the manifold block 510 and the side cover 520 for distributing hydrogen, air, and coolant, because the exemplary embodiment does not require either the manifold block 510 and the side cover 520, the number of parts is reduced, whereby production costs thereof may be reduced and the structure thereof may be simplified.

Furthermore, since the fuel cell 100A or 100B according to the exemplary embodiment employs the sealer 150 to seal the enclosure 300 and the target end plate, the spaces between the enclosure 300 and the end plates 110A and 110B are blocked, preventing leakage of fluid. Therefore, the watertight structure thereof may be simplified, and a closed loop may be formed therein, thus making it possible to protect the cell stack 122 from water, dust, or heat. As a result, the fuel cell according to the exemplary embodiment may exhibit excellent sealing performance.

Furthermore, the fuel cell 100A or 100B according to the exemplary embodiment may further improve a sealing effect using the cap 170.

According to a third comparative example, a plurality of unit cells may be clamped using an enclosure and end plates, rather than using a clamping member. In the instant case, the performance of the fuel cell needs to be evaluated after the enclosure is assembled to the end plates using a sealer. However, if the performance of the fuel cell is defective, the sealer is removed to disassemble the enclosure from the end plates, and the cell stack is replaced. Thereafter, the enclosure is again assembled to the cell stack using the sealer. In the case of repeatedly performing sealer removal and sealer application processes, the fuel cell is increasingly likely to become defective due to contamination of the cell. In contrast, in the case of the exemplary embodiment of the present invention, it is possible to evaluate the performance of the fuel cell before the sealer 150 is applied thereto. In the present way, the process of evaluating the performance of the fuel cell and the process of applying the sealer 150 to the fuel cell are performed independently, and thus it is not necessary to repeatedly perform sealer removal and sealer application processes. Accordingly, there is no likelihood of the fuel cell becoming defective due to contamination.

Furthermore, according to the exemplary embodiment of the present invention, gaps GAP are formed between the partition walls SWA and SWB and at least portions of the external surfaces 110AO and 110BO of the bodies BA and BB.

When a plurality of unit cells is clamped by the clamping member 130, the cell stack 122 may be pressed about 1 mm to 2 mm in the first direction thereof. At the instant time, due to the presence of the gaps GAP, sufficient space in which to accommodate the clamping member 130 may be secured in the gaps GAP.

Furthermore, the internal space between the enclosure 300 and the cell stack 122 is increased due to the gaps GAP, thus increasing the amount of space for venting moisture in the cell stack 122. Accordingly, the performance of the fuel cell may be improved.

Furthermore, in the case in which the gaps GAP are present, the gaps GAP may be used as a mold seat space when manufacturing the end plates.

For the reasons described above, as the sizes of the gaps GAP are increased in the first direction, the performance of the fuel cell may be further improved.

Furthermore, according to the exemplary embodiment of the present invention, unlike the body BA or BB having the clad 116 made of plastic, the partition wall SWA or SWB is made of a metal material, which has higher rigidity than plastic. Accordingly, the rigidity of the partition wall SWA or SWB increases, so that the coupling screw 160 may stably pass through the partition wall SWA or SWB and may be threadedly engaged with the body BA or BB.

As is apparent from the above description, since a fuel cell according to the exemplary embodiment has a short length in the direction in which unit cells are stacked and a low height, the same may be easily used in a vehicle in which packaging of components is greatly restricted, like a passenger car, a high-performance vehicle, or the like. Furthermore, since the number of parts thereof is reduced, production costs thereof may be reduced, and the structure thereof may be simplified. Furthermore, the exemplary embodiment has excellent sealing performance, thus protecting the cell stack from water, dust, or heat. Furthermore, the amount of space for venting moisture in the cell stack may be increased due to the presence of a gap, and thus the performance of the fuel cell may be improved. Furthermore, the gap may be used as a mold seat space, facilitating manufacture of an end plate.

However, the effects achievable through the exemplary embodiments are not limited to the above-mentioned effects, and other effects not mentioned herein will be clearly understood by those skilled in the art from the above description.

The above-described various embodiments may be combined with each other without departing from the scope of the present invention unless they are incompatible with each other. Furthermore, for any element or process which is not described in detail in any of the various embodiments, reference may be made to the description of an element or a process having the same reference numeral in another exemplary embodiment of the present invention, unless otherwise specified.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A fuel cell, comprising:

a cell stack including a plurality of unit cells stacked in a first direction of the cell stack;

an enclosure surrounding side portions of the cell stack, wherein the enclosure includes at least one opening to open at least one of first and second end portions of the cell stack;

first and second end plates respectively disposed at the first and second end portions of the cell stack;

a clamping member configured to clamp the plurality of unit cells in the first direction together with the first and second end plates; and a coupling screw configured to couple the clamping member to a target end plate disposed at the at least one opening in the enclosure, among the first and second end plates, wherein the target end plate includes:
- a body including a first internal surface, facing the cell stack, and an external surface formed opposite to the first internal surface; and
- a partition wall spaced from at least a portion of the external surface in the first direction to form a gap between the partition wall and the external surface, the partition wall being coupled to the enclosure and being made of metal, wherein the coupling screw passes through the partition wall and couples the clamping member and the body to each other via the gap, wherein the partition wall includes a first recess portion having a first through-hole formed therein to allow the coupling screw to pass therethrough, wherein the first recess portion includes:
- a second internal surface; and
- a bottom surface having therein the first through-hole, and wherein the coupling screw includes:
- a head disposed in the first recess portion;
- a first protruding portion protruding from the head toward the second internal surface in a direction intersecting the first direction,
- a sealing seat surface facing the bottom surface; and
- a bearing surface formed to be in contact with the clamping member in the gap.

2. The fuel cell of claim 1, wherein the coupling screw further includes:
- a sealing portion disposed between the sealing seat surface and the bottom surface; and
- a threaded portion threadedly engaged with the body.

3. The fuel cell of claim 1, wherein the partition wall further includes:
- a first reinforcing rib located between the second internal surface and the bottom surface in the first recess portion.

4. The fuel cell of claim 3, wherein the first reinforcing rib has a slanted cross-section.

5. The fuel cell of claim 3, wherein the partition wall further includes:
- a second reinforcing rib having a cross-section protruding from a portion surrounding the first through-hole in the partition wall toward the clamping member in the first direction.

6. The fuel cell of claim 1, wherein the partition wall further includes:
- a second reinforcing rib having a cross-section protruding from a portion surrounding the first through-hole in the partition wall toward the clamping member in the first direction.

7. The fuel cell of claim 1, wherein a cap is disposed to cover the coupling screw.

8. The fuel cell of claim 7,
wherein the cap includes a support portion and a cover portion,
wherein the cover portion covers the coupling screw, and the support portion extends from the cover portion in the first direction to be inserted into the first recess portion.

9. The fuel cell of claim 1, further including:
- a sealer located in the at least one opening at a position at which the enclosure and the partition wall are in contact with each other.

10. The fuel cell of claim 9,
wherein the partition wall includes a second recess portion formed to face the sealer and to be concavely depressed in a third direction intersecting the first direction, and
wherein the enclosure includes a second protruding portion protruding in the third direction to be fitted into the second recess portion at the at least one opening.

11. The fuel cell of claim 10,
wherein the enclosure includes an upper enclosure and a lower enclosure, each of which includes the second protruding portion, respectively to be fitted into corresponding second recess portions.

12. The fuel cell of claim 1, wherein the target end plate further includes:
- a connection portion interconnecting the body and the partition wall.

13. The fuel cell of claim 12, wherein the body, the partition wall, and the connection portion are integrated with each other.

14. The fuel cell of claim 12, wherein the connection portion is integrated with the partition wall, and is formed separately from the body.

15. The fuel cell of claim 1, wherein the clamping member includes:
- a first portion disposed on the cell stack and on the body of the target end plate; and
- a second portion bent from the first portion and extending toward a space in which the gap is formed, and
wherein the second portion has a second through-hole formed therein to allow the coupling screw to pass therethrough, the second through-hole being located to face a portion of the first through-hole.

16. The fuel cell of claim 1, wherein an insulating plate is disposed between the cell stack and the clamping member to electrically insulate the cell stack and the clamping member from each other.

17. The fuel cell of claim 1,
wherein each of the first and second end plates includes a core and a clad,
wherein the core has a first rigidity, and the clad has a second rigidity which is lower than the first rigidity, and
wherein the coupling screw is fastened to the core.

* * * * *